US012116242B2

(12) United States Patent
Duvall

(10) Patent No.: US 12,116,242 B2
(45) Date of Patent: Oct. 15, 2024

(54) ELEVATOR COUNTERWEIGHT MOUNTED GOVERNOR ASSEMBLIES

(71) Applicant: TK Elevator Innovation and Operations GmbH, Duesseldorf (DE)

(72) Inventor: Jeffrey Shawn Duvall, Kennesaw, GA (US)

(73) Assignee: TK ELEVATOR INNOVATION AND OPERATIONS GMBH, Duesseldorf (DE)

( * ) Notice: Subject to any disclaimer, the term of this patent is extended or adjusted under 35 U.S.C. 154(b) by 0 days.

(21) Appl. No.: 18/383,624

(22) Filed: Oct. 25, 2023

(65) Prior Publication Data

US 2024/0132327 A1 Apr. 25, 2024
US 2024/0228230 A9 Jul. 11, 2024

Related U.S. Application Data

(60) Provisional application No. 63/380,792, filed on Oct. 25, 2022.

(51) Int. Cl.
*B66B 5/04* (2006.01)
*B66B 5/18* (2006.01)

(52) U.S. Cl.
CPC ................ *B66B 5/042* (2013.01); *B66B 5/18* (2013.01)

(58) Field of Classification Search
CPC ....... B66B 5/044; B66B 17/12; B66B 5/0075; B66B 11/003; B66B 11/0055
See application file for complete search history.

(56) References Cited

U.S. PATENT DOCUMENTS

| | | | |
|---|---|---|---|
| 10,745,245 | B2 | 8/2020 | Shi et al. |
| 11,254,540 | B2 | 2/2022 | Shimabayashi |

FOREIGN PATENT DOCUMENTS

| | | | | | |
|---|---|---|---|---|---|
| CN | 108910650 | A | | 11/2018 | |
| ES | 2245189 | B1 | * | 2/2007 | ......... B66B 11/0055 |
| WO | WO-2004067428 | A1 | * | 8/2004 | ......... B66B 11/0055 |
| WO | WO-2004071926 | A1 | * | 8/2004 | ......... B66B 11/0045 |
| WO | WO-2007138706 | A1 | * | 12/2007 | ........... B66B 11/003 |

* cited by examiner

*Primary Examiner* — Diem M Tran
(74) *Attorney, Agent, or Firm* — Dinsmore & Shohl LLP

(57) ABSTRACT

Embodiments herein are directed to an elevator counterweight governor assembly for an elevator assembly. The elevator counterweight governor assembly includes a swing arm, a first pulley assembly, a second pulley assembly, a third pulley assembly, and a braking assembly. The swing arm is pivotally coupled to the at least one inner beam at one end. The swing arm is configured to pivot between a disengaged position and an engaged position. The braking assembly is configured to move between an unactivated state where the braking assembly is free from the fixed member and an activated state where the braking assembly engages with the fixed member to inhibit movement of the counterweight frame. When the swing arm is in the disengaged position, the braking assembly is in the unactivated state and when the swing arm is in the engaged position, the braking assembly is in the activated state.

20 Claims, 9 Drawing Sheets

ELEVATOR COUNTERWEIGHT MOUNTED GOVERNOR ASSEMBLIES

CROSS-REFERENCE TO RELATED APPLICATION

This application claims the benefit of and priority to U.S. Provisional Application Ser. No. 63/380,792 filed Oct. 25, 2022, and entitled "Elevator Counterweight Mounted Governor", the entire contents of which are incorporated by reference in the present disclosure.

TECHNICAL FIELD

The present specification generally relates to a counterweight governor assembly and, more specifically, to a counterweight governor assembly positioned within a counterweight frame in a hoistway.

BACKGROUND

It is known to use a counterweight governor assembly to actuate a braking assembly when an over speed of a counterweight frame is determined. Conventional systems mount the counterweight governor assembly in a control room or machine room above a hoistway of an elevator assembly. For elevators that have an occupied space below the counterweight frame in the hoistway, a counterweight braking device must be provided in order to protect any people that could be located in that space. Adding this counterweight braking device requires additional space to be added the hoistway dimensions due to the space required to fit the additional governor, tail weight, and safety.

SUMMARY

An elevator counterweight governor assembly for an elevator assembly is provided. The elevator assembly has a counterweight frame, a plurality of weights, at least one counterweight suspension member, and a fixed member of a hoistway, the counterweight frame is defined by a pair of end beams and at least one inner beam positioned between the pair of end beams, the at least one counterweight suspension member moves the counterweight frame between a plurality of positions in the hoistway and the fixed member guides the counterweight frame within the hoistway between the plurality of positions. The elevator counterweight governor assembly includes a swing arm and a braking assembly. The swing arm is mounted within the counterweight frame and is pivotally coupled to the at least one inner beam at one end and includes a linkage assembly at an opposite end. The swing arm is configured to pivot between a disengaged position and an engaged position. The braking assembly is configured to move between an unactivated state where the braking assembly is free from the fixed member and an activated state where the braking assembly engages with the fixed member to inhibit movement of the counterweight frame. When the swing arm is in the disengaged position, the braking assembly is in the unactivated state and when the swing arm is in the engaged position, the braking assembly is in the activated state.

In another embodiment, an elevator counterweight governor assembly for an elevator assembly is provided. The elevator assembly has a counterweight frame and a fixed member of a hoistway. The counterweight frame is defined by a pair of end beams and at least one inner beam positioned therebetween. The elevator counterweight governor assembly includes a swing arm, a sheave assembly, a flexible elongated member, and a braking assembly. The swing arm is pivotally coupled to the at least one inner beam at one end. The swing arm is configured to pivot between a disengaged position and an engaged position. The sheave assembly rotatably coupled to the swing arm. The flexible elongated member is routed through the sheave assembly. The braking assembly is configured to move between an unactivated state where the braking assembly is free from the fixed member and an activated state where the braking assembly engages with the fixed member to inhibit movement of the counterweight frame. When the swing arm is in the disengaged position, the braking assembly is in the unactivated state and when the swing arm is moved into the engaged position based on a tension on the flexible elongated member, the braking assembly is in the activated state.

In yet another embodiment, an elevator assembly having a hoistway is provided. The elevator assembly includes a fixed member of the hoistway, a counterweight frame, and a counterweight governor assembly. The counterweight frame has a pair of end beams and at least one inner beam positioned therebetween. One of the pair of end beams having a notch portion. The counterweight frame configured to slidably move along the fixed member. The counterweight governor assembly including a swing arm, a sheave assembly, a flexible elongated member, and a braking assembly. The swing arm is pivotally coupled to the at least one inner beam at one end. The swing arm is configured to pivot between a disengaged position and an engaged position. The sheave assembly is rotatably coupled to the swing arm. The sheave assembly has at least one sheave positioned to extend at least partially into the notch portion of the one of the pair of end beams. The flexible elongated member routed through the sheave assembly. The braking assembly configured to move between an unactivated state where the braking assembly is free from the fixed member and an activated state where the braking assembly engages with the fixed member to inhibit movement of the counterweight frame. When the swing arm is in the disengaged position, the braking assembly is in the unactivated state and when the swing arm is moved into the engaged position based on a tension on the flexible elongated member, the braking assembly is in the activated state.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are directed to an elevator assembly that includes a counterweight governor assembly mounted within a counterweight frame itself and uses a single cable to activate the governor. Such an arrangement of the embodiments described here provide many advantages over conventional governor assemblies. In elevator assemblies that include occupied space below the hoistway, a counterweight braking device is included to inhibit movement of the counterweight frame in order to protect any people that could be located in that space. However, adding the conventional counterweight governor assembly requires additional space to be added the hoistway dimensions due to the space required to fit the additional governor, tail weight, and braking assemblies. As such, the arrangement of the counterweight governor assembly described herein eliminates the need for additional space, permitting for more compact hoistway, and a reduction in the number of weights required in the counterweight frame as a result of the weight of the governor assembly.

The counterweight governor assembly described includes a governor pulley rotatably coupled to a swing arm, which is pivotally coupled to the frame of the counterweight frame. When the governor pulley of the governor assembly locks, the swing arm moves or pivots that activates a gear to activate a braking assembly, thus inhibiting movement of the counterweight frame within the hoistway. Since the governor assembly is completely contained within the counterweight frame, the governor assembly does not require any additional space in the hoistway. The single cable is stationary, and therefore it does not require running clearance to the other stationary components in the hoistway. Each of the pulleys of the governor assembly are arranged in such a way as to minimize the vertical height of the total assembly and allow the assembly to fit inside the counterweight frame and to move with the counterweight frame.

Figure 1A:
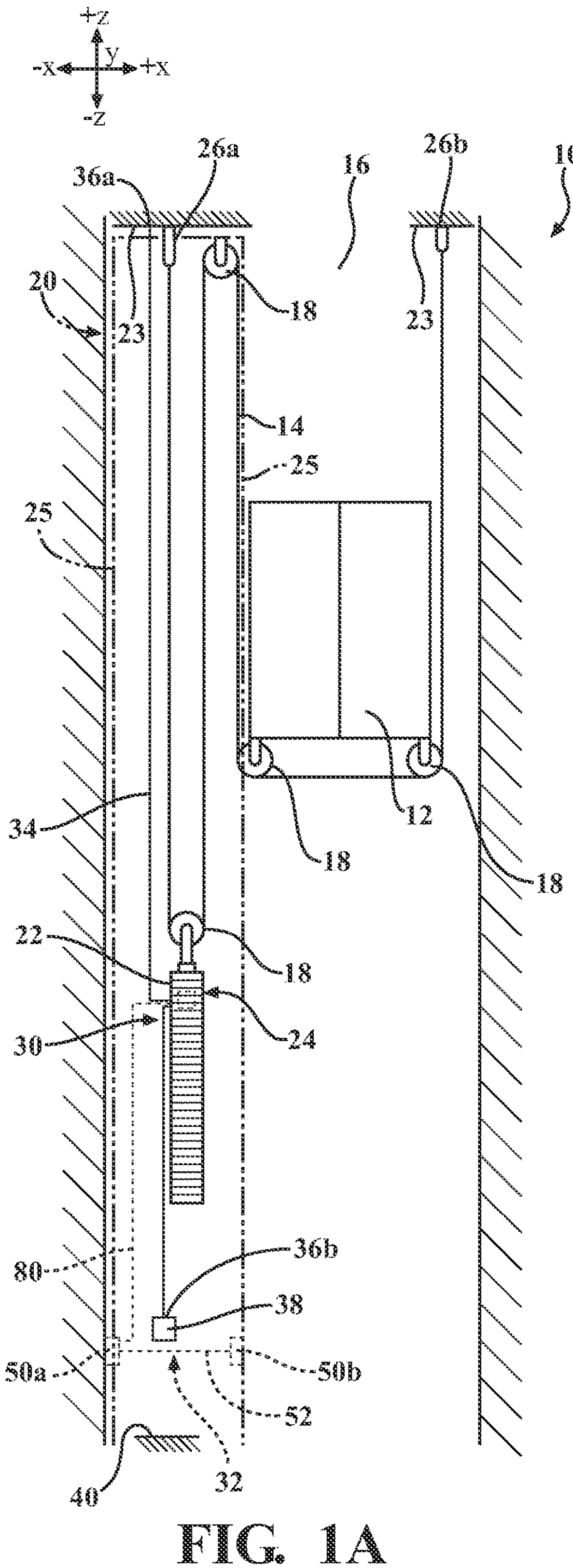
FIG. 1A schematically depicts a first aspect of an elevator assembly schematic, according to one or more embodiments shown and described herein.

As used herein, the term "longitudinal direction" refers to the forward-rearward direction of the elevator assembly (i.e., in a +/−Y direction of the coordinate axes depicted in FIG. 1A). The term "lateral direction" refers to the cross-direction (i.e., along the X axis of the coordinate axes depicted in FIG. 1A), and is transverse to the longitudinal direction. The term "vertical direction" refers to the upward-downward direction of the elevator assembly (i.e., in the +/−Z direction of the coordinate axes depicted in FIG. 1A). As used herein, "upper" is defined as generally being towards the positive Z direction of the coordinate axes shown in the drawings. "Lower" is defined as generally being towards the negative Z direction of the coordinate axes shown in the drawings.

Referring now to FIG. 1A, an elevator assembly schematic that illustrates various components for a first aspect of an example elevator assembly 10 is depicted. In this aspect, the example elevator assembly 10 may include an elevator cab 12, a plurality of suspension members 14 illustrated for schematic reasons as a single suspension member, a hoistway 16 or elevator shaft, a plurality of sheaves 18, an example frame 20 or fixed member of the hoistway 16, and a counterweight frame assembly 22 that includes plurality of split weights 24 that act as a counterweight to the elevator cab 12. The plurality of split weights 24 are positioned within the counterweight frame assembly 22 to move along or between the example frame 20 in the system vertical direction (i.e., in the +/−Z direction). The example frame 20 may be a pair of rails 25 spaced apart by a width in the system lateral direction (i.e., in the +/−X direction) a distance such that the counterweight frame assembly 22 moves along or between the example frame 20 in the system vertical direction (i.e., in the +/−Z direction) and each of the pair of rails 25 extend a length of and within the hoistway 16 elevator frame in the system vertical direction (i.e., in the +/−Z direction). The plurality of suspension members 14 include a distal end 26*a* and a proximate end 26*b*.

Further, in this aspect, as illustrated and without limitation, the example frame 20 includes two sheaves of the plurality of sheaves 18. For example, one sheave is fixedly mounted to an upper portion the example frame 20 positioned in an upper portion of the hoistway 16 above the elevator cab 12 in a vertical direction (i.e., in the +/−Z direction) and another sheave moves with the counterweight frame assembly 22 and the split weights 24 housed therein as the elevator cab 12 moves between various landings. This is non-limiting, and any number of the plurality of sheaves 18 may be mounted anywhere within the hoistway 16 and there may be more than or less than the two sheaves illustrated as being in the example frame 20.

At least one of the plurality of sheaves 18 within the hoistway 16 may include a motor such that the sheave is a traction sheave capable of driving the plurality of suspension members 14 through a plurality of lengths between the elevator cab 12 and the traction sheave. Further, the plurality of sheaves 18 may further include a plurality of idler sheaves that may also be mounted at various positions in the hoistway 16, and, in this aspect, are also coupled to the elevator cab 12. Idler sheaves are passive (they do not drive the plurality of suspension members 14 but rather guide or route the plurality of suspension members 14) and form a contact point, or engagement point, with the elevator cab 12. The plurality of suspension members 14 and the plurality of sheaves 18 move the elevator cab 12 between a plurality of positions within the hoistway 16 including to a plurality of landings. The plurality of sheaves 18 may include any combination of traction type sheaves and idler type sheaves.

As illustrated in FIG. 1A, the elevator assembly 10 is an underslung system, with the idler sheaves positioned on a bottom surface of the elevator cab 12. Each of the plurality of suspension members 14 may be movably coupled to the traction sheave and a portion of the suspension members 14 may be coupled to the bottom surface of the elevator cab 12 to suspend the elevator cab 12 via the idler sheaves. As such, the suspension members 14 pass under the elevator cab 12 on a bottom of the elevator cab 12 via the idler sheaves, and are coupled at the top of the hoistway 16 under tension to various structures, such as to the example frame 20, a plurality of rail caps 23, and/or the like. For example, the proximate end 26*b* of the suspension members 14 may be fixedly coupled to the rail caps 23 and the movably coupled portion of the suspension members 14 are under tension to move the elevator cab 12 between various landings. The example frame 20 may include a dead end hitch, at least one of the plurality of rail caps 23, or other structural components.

Further, as illustrated and without limitation, the counterweight frame assembly 22 may further include a counterweight governor assembly 30 and a braking assembly 32. The counterweight governor assembly 30 may include a flexible elongated member 34, such as a cable or rope, that includes a proximate end 36*a* fixedly coupled to a mounting position with the hoistway 16, such as, without limitation, the rail cap 23, or another mounting position above the counterweight frame assembly 22 in the vertical direction (i.e., in the +/−Z direction). A distal end 36*b* of the flexible elongated member 34, opposite to the proximate end 36*a*, coupled to a mass 38 or biasing member that may be coupled to a floor 40 of the hoistway 16 to create a predetermined tension in the flexible elongated member 34, as discussed in greater detail herein.

Figure 1B:
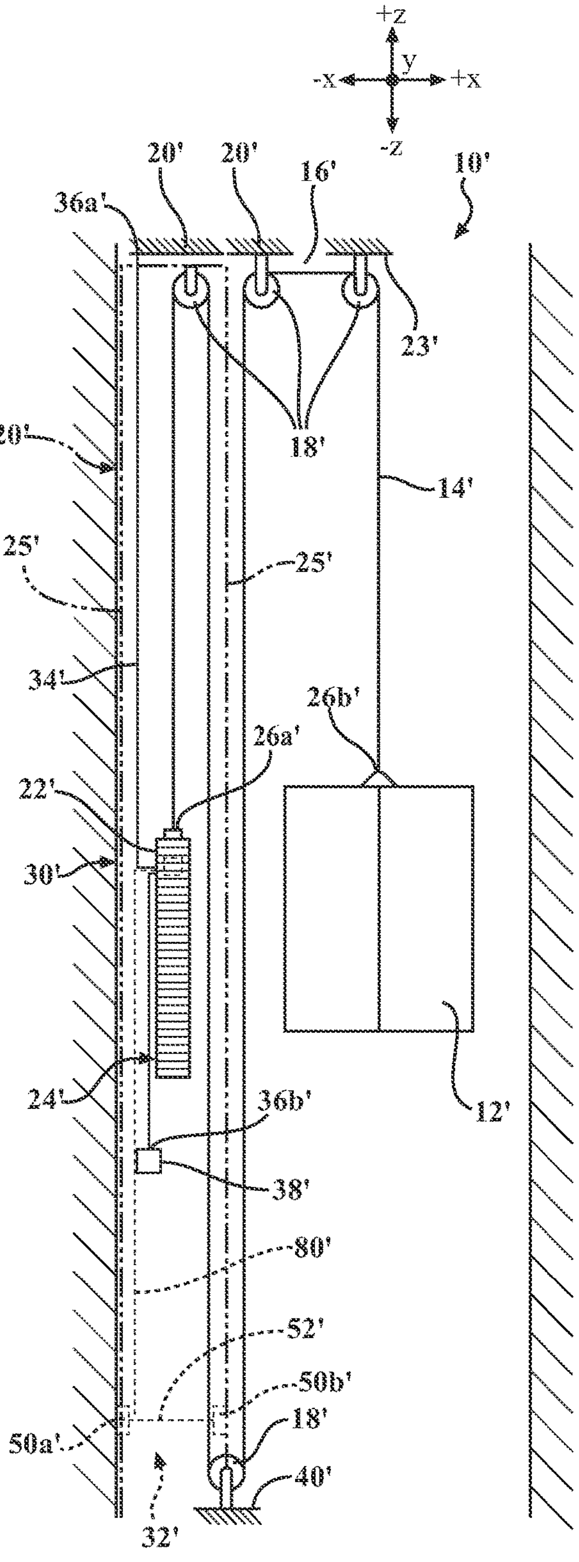
FIG. 1B schematically depicts a second aspect of an elevator assembly schematic, according to one or more embodiments shown and described herein.

Referring now to FIG. 1B, a schematic illustrates various components for a second aspect of an example elevator assembly 10' is depicted. It should be appreciated that the in the discussion herein, the elevator assembly 10 may refer to either elevator assembly 10, 10'. In this aspect, the elevator assembly 10' may include an elevator cab 12', a plurality of suspension members 14' illustrated for schematic reasons as a single suspension member, a hoistway 16' or elevator shaft, a plurality of sheaves 18', such as traction sheaves and/or idler sheaves, an example frame 20' or fixed member of the hoistway 16', and a counterweight frame assembly 22' that includes plurality of split weights 24' that act as a counterweight to the elevator cab 12'. The plurality of split weights 24' are positioned within the counterweight frame assembly 22' to move along or between the example frame 20' in the system vertical direction (i.e., in the +/−Z direction). The example frame 20' may be a pair of rails 25' spaced apart by a width in the system lateral direction (i.e., in the +/−X direction) a distance such that the counterweight frame assembly 22' moves along or between the example frame 20' in the system vertical direction (i.e., in the +/−Z direction) and each of the pair of rails 25' extend a length of and within the hoistway 16' elevator frame in the system vertical direction (i.e., in the +/−Z direction). The plurality of suspension members 14' include a distal end 26*a'* and a proximate end 26*b'*.

In this aspect, the plurality of suspension members 14' extend a length between the counterweight frame assembly 22' and the elevator cab 12'. Further, in this aspect, at least one of the plurality of sheaves 18' is a traction sheave, which, for example, may be mounted to a lower surface of the hoistway 16'. This is non-limiting, and the traction sheave of the plurality of sheaves 18' may be mounted anywhere within the hoistway 16' and the plurality of sheaves 18' may include a plurality of idler sheaves and at least one traction sheave. It should be appreciated that the traction sheave may include a motor such that at least one of the plurality of sheaves 18' is a device to drive the plurality of suspension members 14' through a plurality of lengths with respect to the length between the traction sheave and the contact point of the elevator cab 12'. The idler sheaves may also be mounted at various positions in the hoistway 16' including within the example frame 20'. The idler sheaves are passive (they do not drive the plurality of suspension members 14' but rather guide or route the plurality of suspension members 14'). The plurality of suspension members 14' are coupled to the elevator cab 12' to form the contact point.

Further, as illustrated and without limitation, the counterweight frame assembly 22' may further include a counterweight governor assembly 30' and a braking assembly 32'. The counterweight governor assembly 30' may include a flexible elongated member 34', such as a cable or rope, that includes a proximate end 36*a'* fixedly coupled to a mounted position with the hoistway 16', such as, without limitation, the rail cap 23', and a distal end 36*b'*, opposite to the proximate end 36*a'*, coupled to a mass 38' or biasing member that may be coupled to a floor 40' of the hoistway 16, as discussed in greater detail herein.

It should be appreciated that the illustrated schematics of FIGS. 1A-1B are merely examples and that the suspension members 14 routing may vary significantly or slightly from these illustrated schematics. For example, there may be several idler sheaves positioned in the hoistway 16 between the traction sheave and the contact point with the elevator cab 12.

Still referring to FIG. 1A, and now to FIGS. 2A-3B, the counterweight frame assembly 22 may include, in this embodiment, a pair of end beams 40*a*, 40*b* spaced apart by a pair of inner beams 42*a*, 42*b* positioned between the pair of end beams 40*a*, 40*b*. This is non-limiting and the counterweight frame assembly 22 may include the pair of end beams 40*a*, 40*b* and at least one inner beam of the pair of inner beams 42*a*, 42*b*. The pair of end beams 40*a*, 40*b* and the pair of inner beams 42*a*, 42*b* may be generally C-channel and may extend in the vertical direction (i.e., in the +/−Z direction) between a base member 44*a* and a header member 44*b*, which are positioned to extend be perpendicular or transverse direction to the pair of end beams 40*a*, 40*b* and the pair of inner beams 42*a*, 42*b*. The plurality of split weights 24 are positioned between the one of the pair of end beams 40*a* and one of the pair of inner beams 42*a* and between the other one of the pair of end beams 40*b* and the other one of the pair of inner beams 42*b* and between the base member 44*a* and the header member 44*b*, depending on the amount of counterweight required, as is appreciated by those skilled in the art.

The end beam 40*a* further includes a notch 46 or cutout to provide the space or clearance need for the counterweight governor assembly 30, as discussed in greater detail herein.

A counterweight buffer 48 extends from an exterior surface 49 of the base member 44*a*. A support bracket 47 extends from the end beam 40*a* and may generally be a "C" shape to surround the notch 46 and to provide additional support for the counterweight governor assembly 30, as discussed in greater detail herein.

Figure 6:
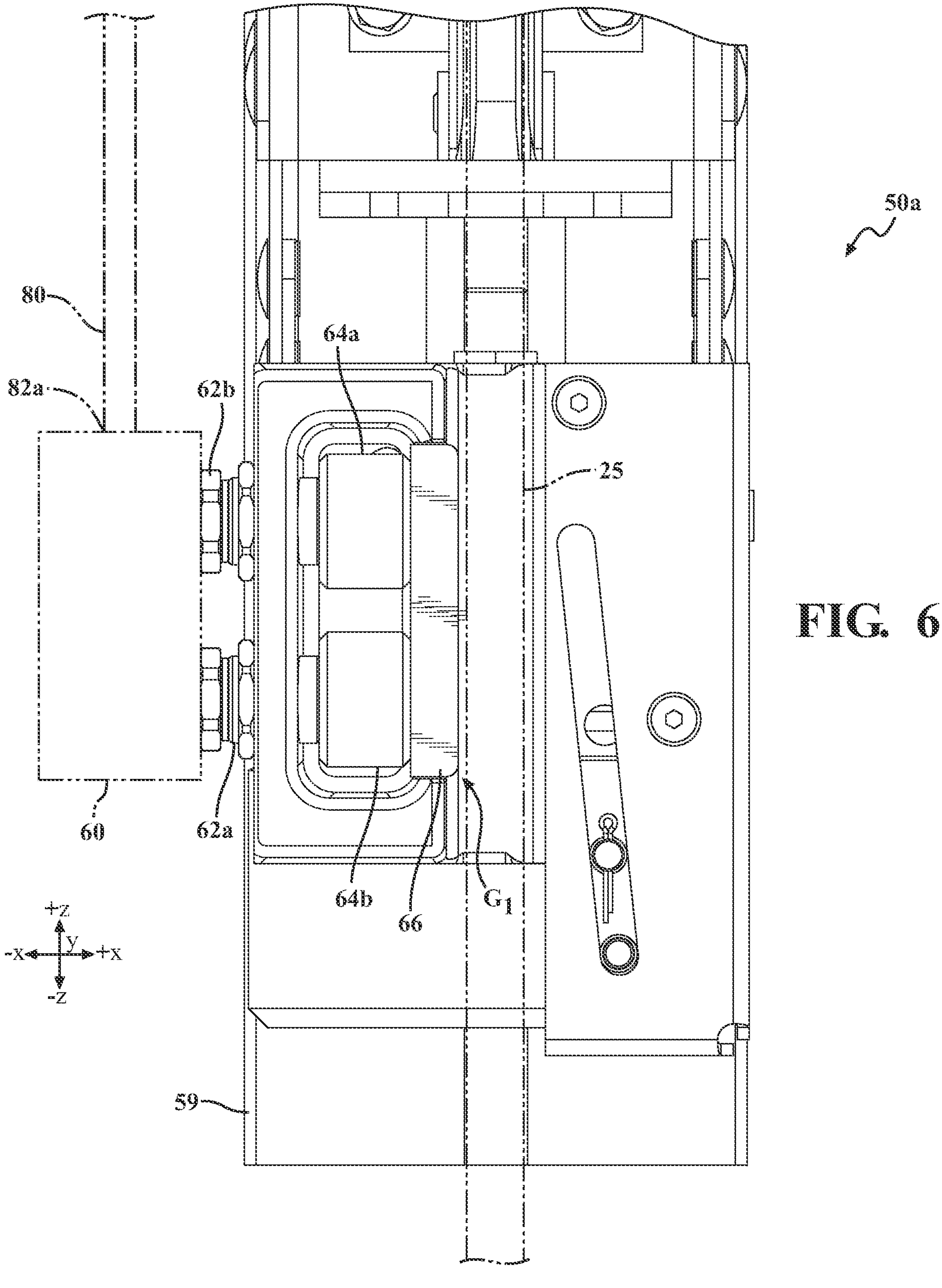
FIG. 6 schematically depicts a partial isolated side view of a brake shoe assembly of the elevator assembly of FIG. 1A with the brake shoe assembly in an unactivated state according to one or more embodiments shown and described herein.

Still referring to FIGS. 1A-3B and also now also to FIGS. 6-7, positioned below the base member 44*a* is the braking assembly 32. The braking assembly 32 may include, in some embodiments, a pair of brake shoe assemblies 50*a*, 50*b* connected to one another via a brake linkage 52 extending below the base member 44*a* between the pair of rails 25. In some embodiments, the brake linkage 52 is a mechanical connection between each of the pair of brake shoe assemblies 50*a*, 50*b*. In other embodiments, an actuator 54, or other device, may be utilized to activate at least the brake shoe assembly 50*b*, when the brake shoe assembly 50*a* is activated, as discussed in greater detail herein. In other embodiments, there may be only a single shoe assembly such as the brake shoe assembly 50*a*.

The brake shoe assembly 50*a* may be coupled to an actuation device 60, which is operably coupled to a linkage 80. The actuation device 60 may be operably coupled or mounted to a pair of plungers 62*a*, 62*b*, extending from a housing 59 of the brake shoe assembly 50*a*, or to another activation or trigger such as a gear, lever, and/or the like. In some embodiments, each of the plungers 62*a*, 62*b* may be operably coupled to a respective pair of cylinders 64*a*, 64*b* that are configured to fluidly move or displace at least one brake pad 66 against the rail 25, as best illustrated in FIG. 7, illustrated by arrows 68, and disengaged from the rail 25, as best illustrated in FIG. 6. The pair of cylinders 64*a*, 64*b* may be configured to pneumatically move the at least one brake pad 66, hydraulically move the at least one brake pad 66, and/or the like. The actuation device 60 may be any device, whether mechanical, electrical, mechanical-electrical, magnetic, combinations thereof, and/or the like, that may trigger to mechanical make contact otherwise provide a signal to each of the plungers 62*a*, 62*b* to change a state of the at least one brake pad 66 with respect to whether the at least one brake pad 66 is an unactivated state, where the at least one brake pad 66 of the brake shoe assembly 50*a* is free from the rail 25 to allow for movement of the counterweight frame assembly 22, as best illustrated in FIG. 6 with the gap G1 between the at least one brake pad 66 and the rail 25, and an activated state, where the at least one brake pad 66 of the brake shoe assembly 50*a* engages with the rail 25 to inhibit movement of the counterweight frame assembly 22, as best illustrated in FIG. 7 where the gap G1 is removed and the arrows 68 indicate movement of the at least one brake pad 66.

Figure 3A:
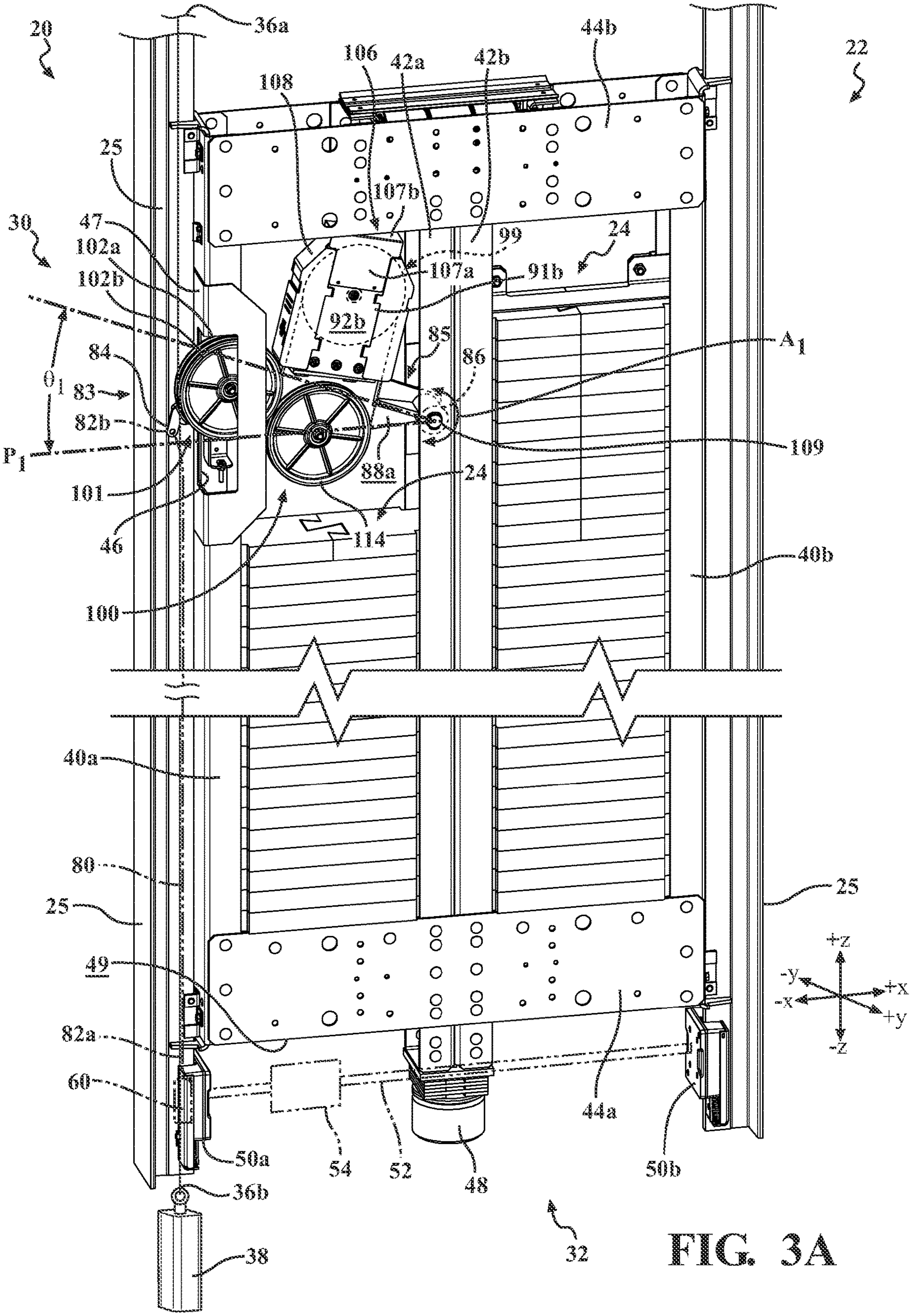
FIG. 3A schematically depicts a partially isolated perspective view of the example frame and the counterweight frame assembly of the elevator assembly of FIG. 1A with the swing arm of a governor assembly in an engaged position, according to one or more embodiments shown and described herein.
Figure 3B:
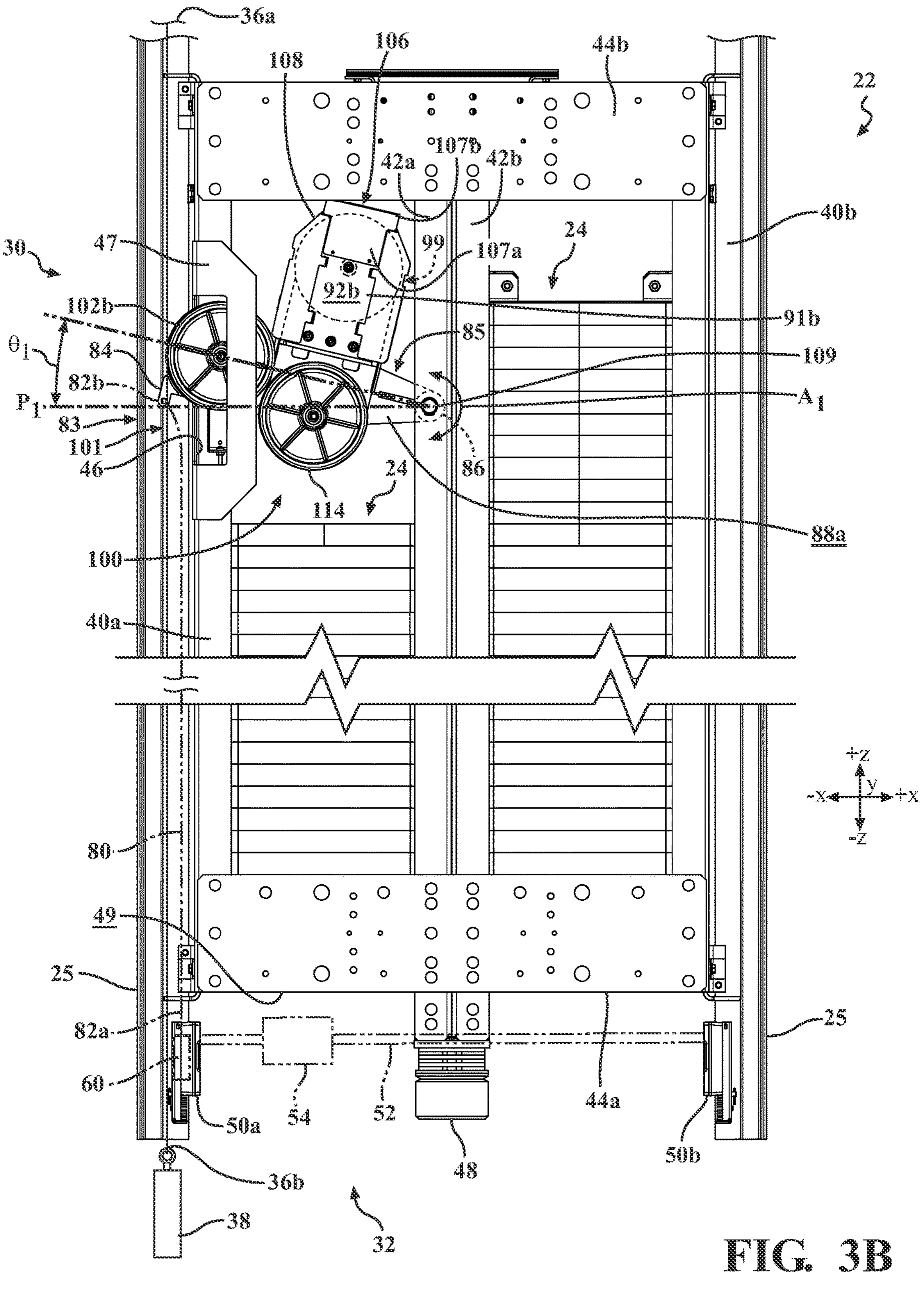
FIG. 3B schematically depicts a partially isolated front view of the example frame and the counterweight frame assembly of the elevator assembly of FIG. 3A with the swing arm of a governor assembly in the engaged position, according to one or more embodiments shown and described herein.
Figure 4:
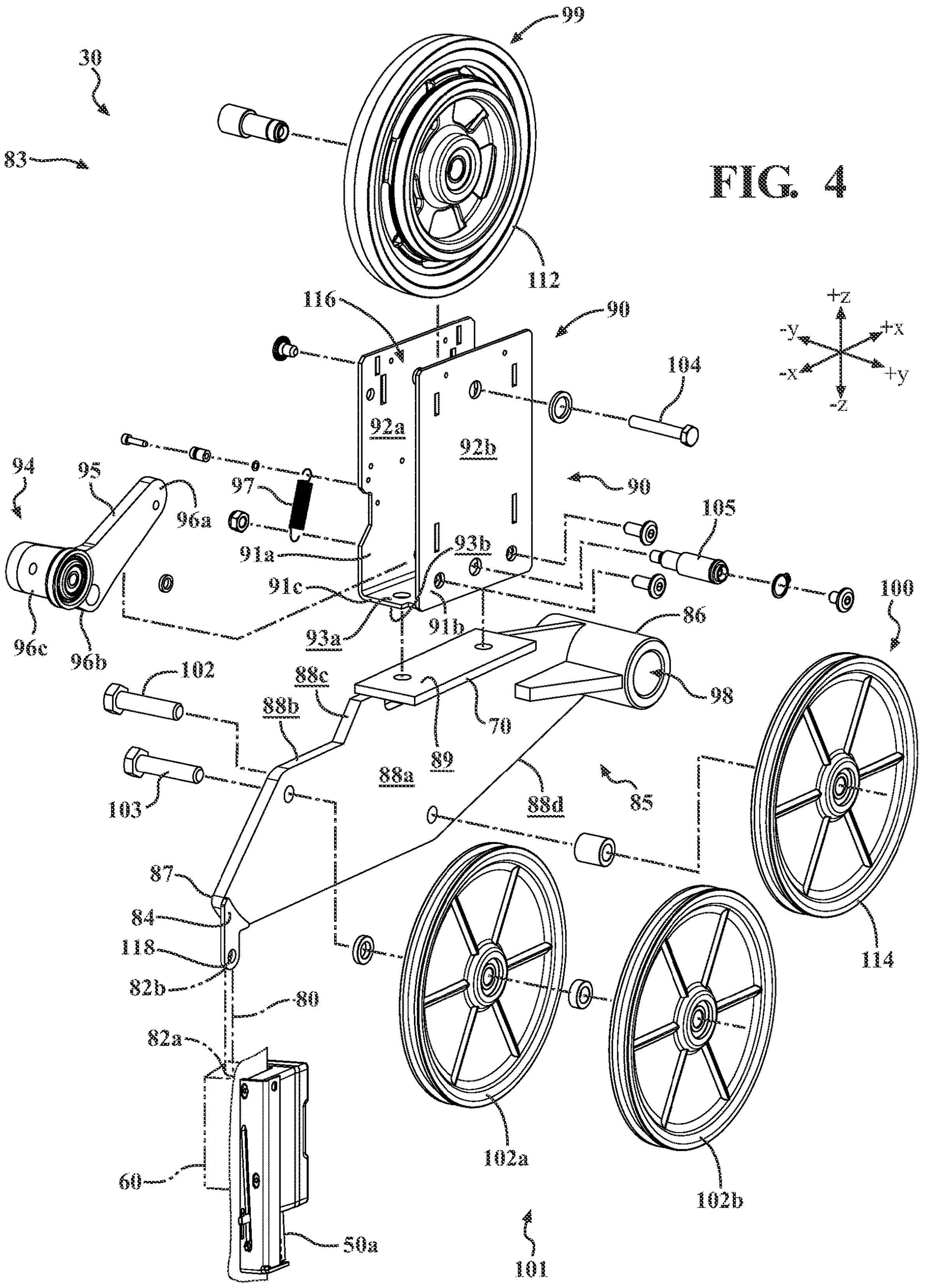
FIG. 4 schematically depicts an exploded perspective view of the governor assembly of FIG. 2A according to one or more embodiments shown and described herein.
Figure 5:
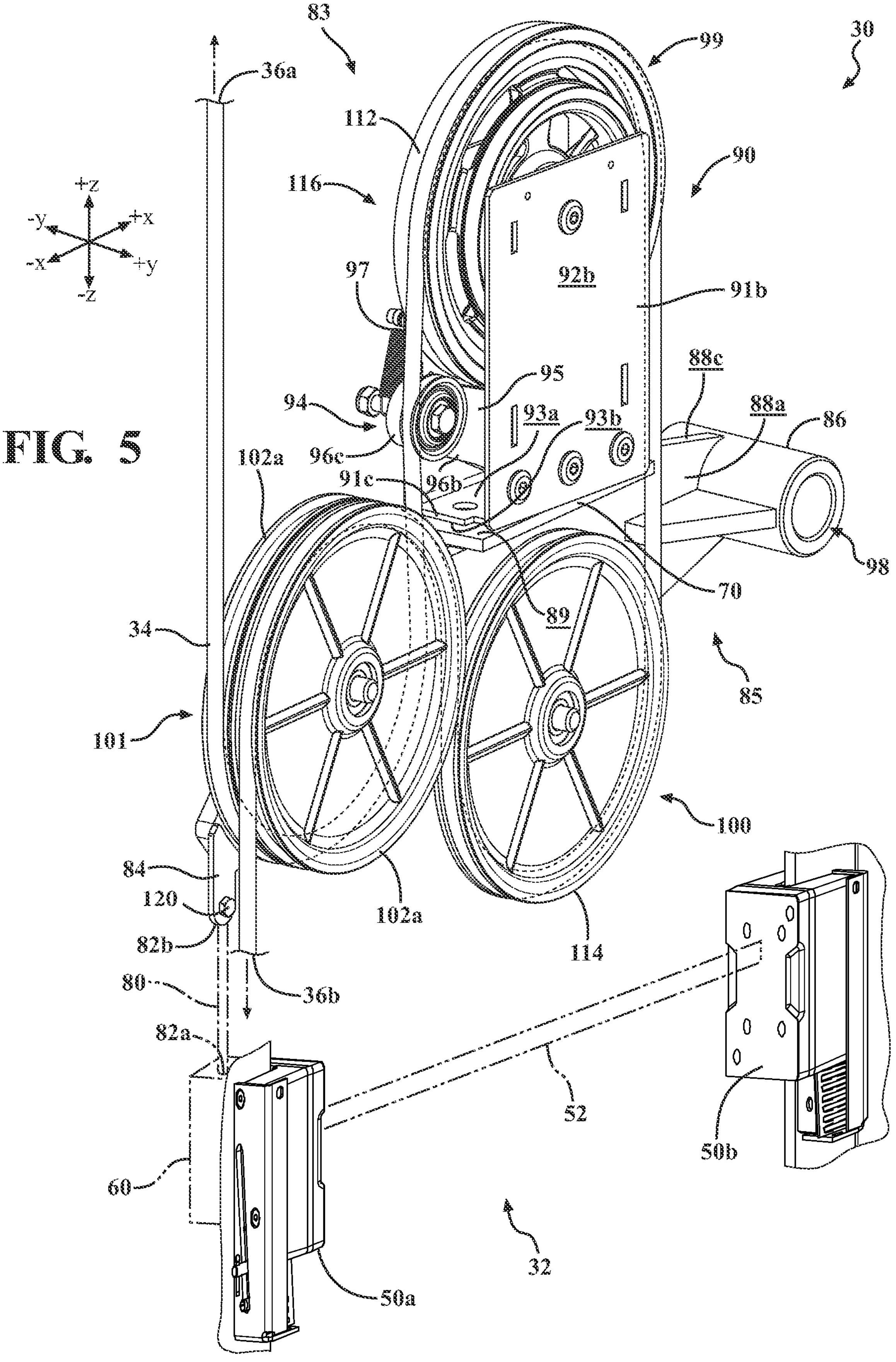
FIG. 5 schematically depicts an isolated perspective view of the governor assembly of FIG. 2A illustrating a routing of a flexible elongated member according to one or more embodiments shown and described herein.

Referring back to FIGS. 1A-3B and also referring to FIGS. 4-5, the linkage 80 extends between the counterweight governor assembly 30, at a proximate end 82*b* and to the actuation device 60 at a distal end 82*a*. In some embodiments, the linkage 80 may be formed of a rigid material, such as, without limitation, composites, plastics, iron, metal, steel, aluminum, alloys, and the like. In other embodiments, the linkage 80 may be formed of flexible material, such as, without limitation, polyaramid (Kevlar) fiber, steel (various grades), glass fiber, carbon fiber, rubber, leather, elastomers, plastics, and/or the like.

The counterweight governor assembly 30 may include a swing arm 85, a sheave assembly 83 mounted to the swing arm 85, a lower bracket assembly 90, an upper bracket assembly 106, a housing 108, the linkage 80 and the flexible elongated member 34 routed through sheave assembly 83, as discussed in greater detail herein.

The swing arm 85 includes a collar end 86, an opposite linkage end 87, a pair of spaced apart side surfaces 88*a*, 88*b* extending between the collar end 86 and the linkage end 87 and defining an upper surface 88*c* and an opposite lower surface 88*d* between the collar end 86 and the linkage end 87. A support bracket portion 70 extends from the upper surface 88*c* between the collar end 86 and the linkage end 87. The support bracket portion 70 may include a planar surface 89 extending opposite from and/or spaced apart from the upper surface 88*c*. In some embodiments, the swing arm 85 may be a monolithic single structure that is integrally formed. In other embodiments, components of the swing arm 85 may be coupled or otherwise attached via fasteners. In a non-limiting example, the support bracket portion 70 may be coupled or otherwise attached to the upper surface 88*c* of the swing arm 85 via fasteners, such as, without limitation, bolt and nut, screw, rivet, weld, epoxy, adhesive, and/or the like.

The collar end 86 of the swing arm 85 may be flared to have a width greater than the upper surface 88*c* and the lower surface 88*d*. The collar end 86 may include a bore 98 extending therethrough and configured to receive an elongated member 109 that extends between and through corresponding bores in the inner beam 42*a* to pivotally couple the collar end 86 of the swing arm 85 to the channel of the inner beam 42*a*. The elongated member 109 may be a bolt, screw, rivet, and the like, with a diameter large enough to support the swing arm 85 and to allow or permit the collar end 86 of the swing arm to pivot or move with respect to the inner beam 42*a*, illustrated by arrow A1 in FIGS. 2A-3B. The linkage end 87 may include a linkage support member 84 extending thereform that includes an aperture 118 configured to receive and/or otherwise couple the proximate end 82*b* of the linkage 80 to the linkage support member 84. In some embodiments, proximate end 82*b* of the linkage 80 may directly couple to the aperture 118. In other embodiments, the proximate end 82*b* of the linkage 80 may be coupled to the aperture via a fastener 120, such as, without limitation, a bolt and nut, screw, rivet, adhesive, epoxy, weld, and/or the like. In some embodiments, the linkage support member 84 may be monolithically formed as a single piece with the linkage end 87 of the swing arm 85 to be integrally formed together. In other embodiments, the proximate end 82*b* of the linkage 80 may be coupled to the linkage support member 84 via fasteners, such as, without limitation, bolt and nut, screw, rivet, weld, epoxy, adhesive, and/or the like.

The lower bracket assembly 90, the upper bracket assembly 106, and the housing 108 may each extend from the upper surface 88*c* of the swing arm 85. The lower bracket assembly 90 may include a pair of sidewalls 91*a*, 91*b*, and an end wall 91*c* to define a channel 116. Each of the pair of sidewalls 91*a*, 91*b* include an interior surface 92*a* and an opposite exterior surface 92*b*. The end wall 91*c* includes an inner surface 93*a* and an opposite outer surface 93*b*. The interior surface 92*a* of the pair of sidewalls 91*a*, 91*b* and the inner surface 93*a* of the end wall 91*c* may define the channel 116. The outer surface 93*b* of the end wall 91*c* of the lower bracket assembly 90 abuts and may be coupled to the planar surface 89 of the support bracket portion 70. The lower bracket assembly 90 may be a monolithic single structure that is integrally formed (e.g., the pair of sidewalls 91*a*, 91*b* and the end wall 91*c* are formed together from a single piece). In other embodiments, components of the lower bracket assembly 90 may be coupled or otherwise attached via fasteners.

In a non-limiting example, the pair of sidewalls 91*a*, 91*b*, or the end wall 91*c* may be coupled or otherwise attached to one another via fasteners, such as, without limitation, bolt and nut, screw, rivet, weld, epoxy, adhesive, and/or the like. In a non-limiting example, the end wall 91*c* may be coupled or otherwise attached to the planar surface 89 of the support bracket portion 70 via fasteners, such as, without limitation, bolt and nut, screw, rivet, weld, epoxy, adhesive, and/or the like. The lower bracket assembly 90 may be formed from any material, including, but not limited to, a metal, such as steel, aluminum, copper, and/or the like, a polymer, a composite, a plastic, a resin, and/or the like.

The upper bracket assembly 106 may cover the channel 116 and be coupled to the pair of sidewalls 91*a*, 91*b* of the lower bracket assembly 90. The upper bracket assembly 106 may include a pair of sidewalls 107*a* and an end wall 107*b*. Each of the pair of sidewalls 107*a* and the end wall 107*b* of the upper bracket assembly 106 include an inner surface and an opposite outer surface similar to the lower bracket assembly 90, but inverted such that the end wall is at the most vertical position of the upper bracket assembly 106 in the vertical direction (i.e., in the +/−Z direction). The sidewalls 107*a* and the end wall 107*b* of the upper bracket assembly 106 extend the channel 116 in the vertical direction (i.e., in the +/−Z direction).

The upper bracket assembly 106 may be a monolithic single structure that is integrally formed (e.g., the pair of sidewalls 107*a* and the end wall 107*b* are formed together from a single piece). In other embodiments, components of the upper bracket assembly 106 may be coupled or otherwise attached via fasteners. In a non-limiting example, the pair of sidewalls 107*a* or the end wall 107*b* may be coupled or otherwise attached to one another via fasteners, such as, without limitation, bolt and nut, screw, rivet, weld, epoxy, adhesive, and/or the like. In a non-limiting example, each of the sidewalls 107*a* may have a portion that overlaps with and is coupled to the pair of sidewalls 91*a*, 91*b* of the lower bracket assembly 90 via fasteners, such as, without limitation, bolt and nut, screw, rivet, weld, epoxy, adhesive, and/or the like. The upper bracket assembly 106 may be formed from any material, including, but not limited to, a metal, such as steel, aluminum, copper, and/or the like, a polymer, a composite, a plastic, a resin, and/or the like.

The housing 108 is configured to cover the cover the channel 116 such that the lower bracket assembly 90 and the upper bracket assembly 106 retain the housing 108 and be coupled to the pair of sidewalls 91*a*, 91*b* of the lower bracket assembly 90. In some embodiments, the housing 108 may be coupled to the coupled to the planar surface 89 of the support bracket portion 70 of the swing arm 85 via fasteners, such as, without limitation, bolt and nut, screw, rivet, weld, epoxy, adhesive, and/or the like. In some embodiments, the housing 108 may be coupled to other part of the swing arm 85. In some embodiments, the housing 108 may be a two-piece housing with a seam positioned such that the lower bracket assembly 90 and the upper bracket assembly 106 retain each half of the housing 108. In other embodiments, the housing 108 may be a monolithic single structure that is integrally formed from a single piece. The housing 108 may be formed from any material, including, but not limited to, a metal, such as steel, aluminum, copper, and/or the like, a polymer, a composite, a plastic, a resin, and/or the like.

The sheave assembly 83 includes a first pulley assembly 99 which includes a pulley 112 rotatably coupled to the pair of sidewalls 91*a*, 91*b* of the lower bracket assembly 90 within the channel 116 via fastener 104, a second pulley assembly 100 including a pulley 114 rotatably coupled to the side surface 88*a* of the swing arm 85 via fastener 102, and a third pulley assembly 101 rotatably coupled to the side surface 88*a* of the swing arm 85 via fastener 103 such that a portion of the third pulley assembly 101 is positioned with the notch 46 of the end beam 40*a* and/or extending within the support bracket 47. The pulley 112 is positioned with the channel 116 of lower bracket assembly 90 and is positioned and coupled to the pair of sidewalls 91*a*, 91*b* to be suspended above the inner surface 93*a* of the end wall 91*c*. As such, the pulley 112 rotates within the channel 116

Figure 2A:
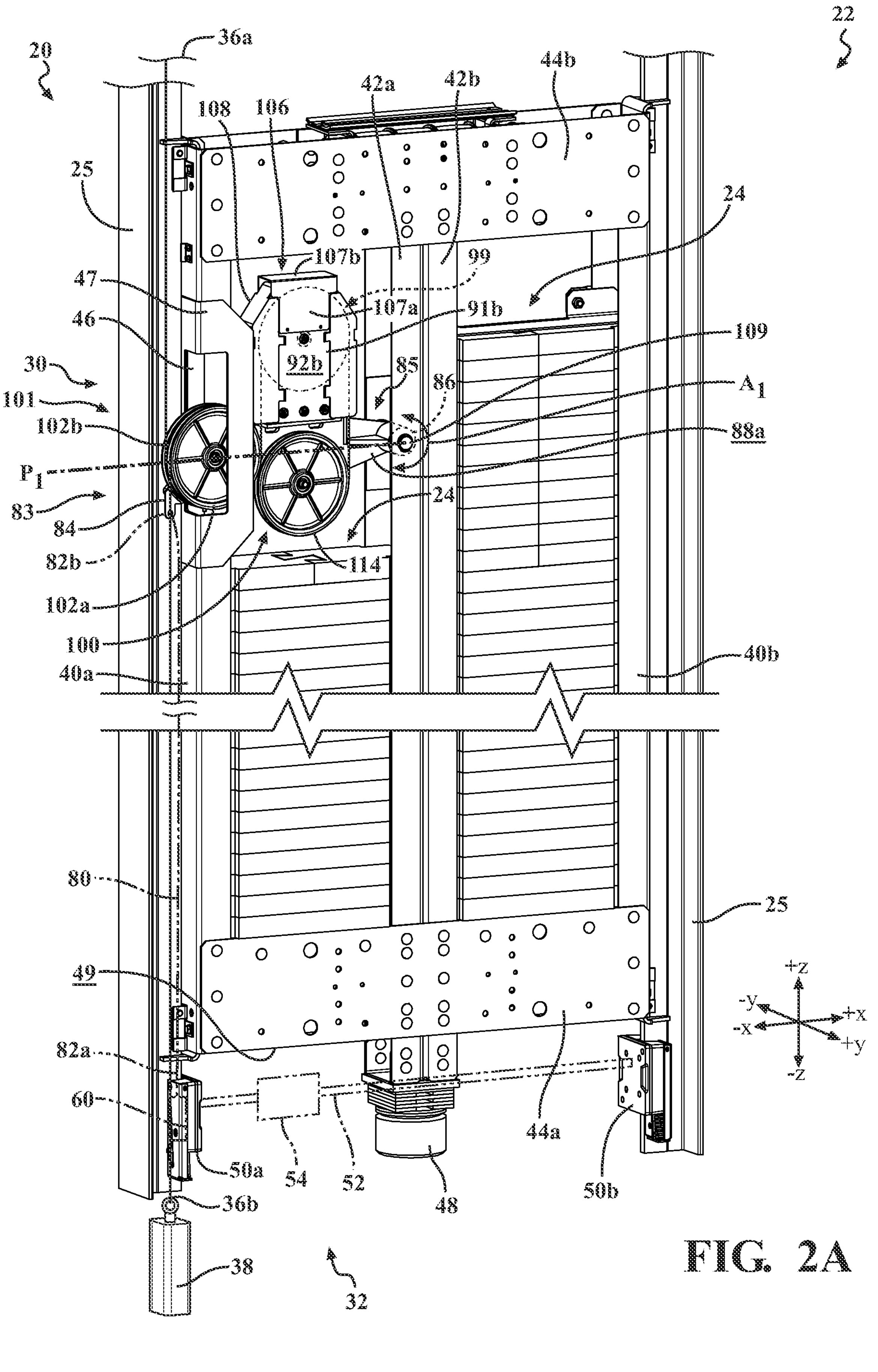
FIG. 2A schematically depicts a partially isolated perspective view of an example frame and a counterweight frame assembly of the elevator assembly of FIG. 1A with a swing arm of a governor assembly in a disengaged position, according to one or more embodiments shown and described herein.
Figure 2B:
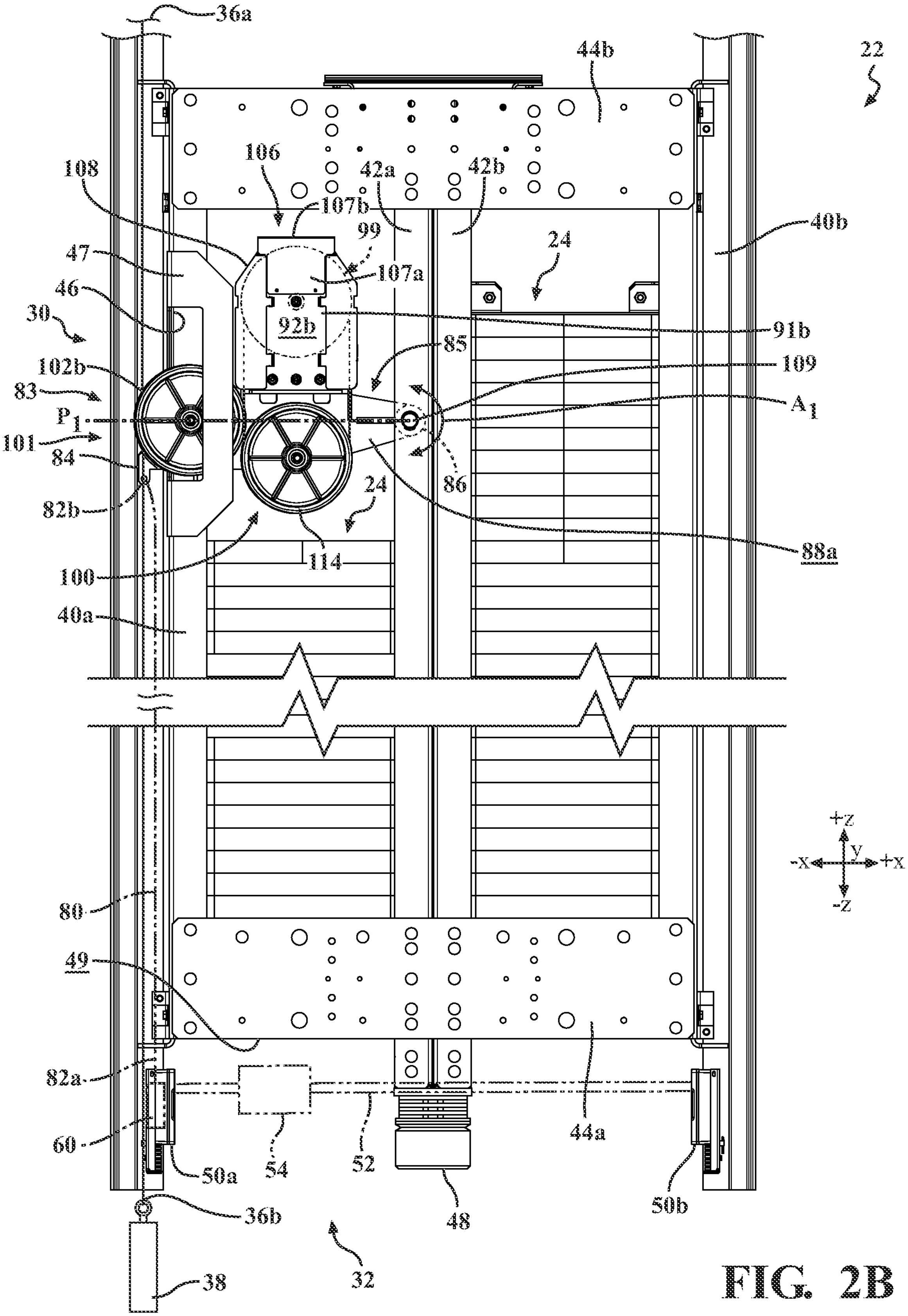
FIG. 2B schematically depicts a partially isolated front view of the example frame and the counterweight frame assembly of the elevator assembly of FIG. 2A with the swing arm of a governor assembly in the disengaged position, according to one or more embodiments shown and described herein.

The third pulley assembly 101 may include a pair of pulleys 102*a*, 102*b*, or sheaves. Each of the pair of pulleys 102*a*, 102*b* may be concentric with one another and configured to independently rotate. In some embodiments, each of the pair of pulleys 102*a*, 102*b* may be identically sized and shaped. In other embodiments, one of the pair of pulleys 102*a*, 102*b* may be sized and/or shaped differently as required by factors appreciated by those skilled in the art, such as, without limitation, type, size and/or length of flexible elongated member 34, size and weight of the mass 38 or spring, the number of pulleys in the sheave assembly 83, and/or the like, to generate the amount of predetermined tension to maintain the swing arm 85 in the perpendicular position (e.g., 0 degrees of pivot with respect to or from a pivot line P1 as best shown in FIGS. 2A-2B), as discussed in greater detail herein. It should be understood that portions of the third pulley assembly 101 extend into the notch 46 and through the support bracket 47 to allow for the counterweight governor assembly 30 to be mounted in the counterweight frame assembly 22 itself due to the compact arrangement of the third pulley assembly 101. The fastener 102, the fastener 103, and/or the fastener 104, may be, without limitation, bolt and nut, screw, rivet, weld, epoxy, adhesive, and/or the like, to rotatably couple the pulleys 112, 114, 102*a*, 102*b*, respectively, to the swing arm 85 or components thereof.

The pulley 112 and the pulley 114 may be arranged such that a center portion of each axially align in the vertical direction (i.e., in the +/−Z direction). That is, the pulley 112 and the pulley 114 may be vertically aligned such that the pulley 112 is positioned directly above the pulley 114 in the vertical direction (i.e., in the +/−Z direction). Each of the pulleys 102*a*, 102*b* of the third pulley assembly 101 may be positioned towards the notch 46 such that at least a portion of the pulleys 102*a*, 102*b* of the third pulley assembly 101 are positioned within the notch 46. As such, both of the pulleys 102*a*, 102*b* of the third pulley assembly 101 are positioned closer to the end beam 40*a* compared to both the pulley 112 and the pulley 114 in the lateral direction (i.e., in the +/−X direction). Further, both of the pulleys 102*a*, 102*b* of the third pulley assembly 101 are offset from the pulley 114 in the vertical direction (i.e., in the +/−Z direction) such that a portion of the of the pulleys 102*a*, 102*b* of the third pulley assembly 101 are positioned above the pulley 114 in the vertical direction (i.e., in the +/−Z direction) and each of the pulleys 102*a*, 102*b* of the third pulley assembly 101 are positioned entirely below the pulley 112 in the vertical direction (i.e., in the +/−Z direction).

The first pulley assembly 99 further includes a tensioner assembly 94 extending with the channel 116 of the lower bracket assembly 90. The tensioner assembly 94 may include an arm 95 that includes a first end 96*a* coupled to one at least one of the pair of sidewalls 91*a*, 91*b* within the channel 116 and an opposite second end 96*b* that may include an engaging member 96*c* rotatably coupled thereto and configured to engage with the flexible elongated member 34 at a predetermined tension. The engaging member 96*c* may generally be circular in shape with an annular groove to receive and retain the flexible elongated member 34 under the predetermined tension. A biasing member 97 extends between and coupled to one of the pair of sidewalls 91*a*, 91*b* and the arm 95 of the tensioner assembly 94 to assist in providing the predetermined tension to the flexible elongated member 34. As such, the biasing member 97 may have different potential or kinetic energy based on the desired predetermined tension of the flexible elongated member 34, as understood by those skilled in the art. In some embodiments, the biasing member 97 is coupled to the second end 96*b* via a fastener, such as, without limitation, bolt and nut, screw, rivet, weld, epoxy, adhesive, and/or the like, to rotatably couple the engaging member to the second end 96*b* of the arm 95 or components thereof.

As such, the flexible elongated member 34 is routed between and in communication with the engaging member 96*c* of the tensioner assembly 94, the pulley 112 of the first pulley assembly 99, the pulley 114 of the second pulley assembly 100, and both the pulleys 102*a*, 102*b* of the third pulley assembly 101.

In operation, the counterweight governor assembly 30 is configured to sense an over speed of the counterweight frame assembly 22 by a deviation or change in the tension of the flexible elongated member 34 greater than a predetermined threshold of the predetermined tension. When the tension of the flexible elongated member 34 increases to be greater than the predetermined threshold of the predetermined tension, whether gradually or immediately, the tensioner assembly 94 and the first pulley assembly 99 act as the governor to lock the first pulley assembly 99. Because the swing arm 85 is pivotally coupled to the inner beam 42*a* at the collar end 86 via the elongated member 109 extending through the inner beam 42*a* and the bore 98 such that the swing arm 85 pivots about the elongated member 109, illustrated by arrow A1 in FIGS. 2A-3B. As such, the swing arm 85 is configured to pivot between a disengaged position, as best illustrated in FIGS. 2A-2B, where the governor is not actuated, and an engaged position, as best illustrated in FIGS. 3A-3B, where the governor is activated. In the disengaged position, the swing arm 85 is generally perpendicular between the inner beam 42*a* and the end beam 40*a* (e.g., 0 degrees of pivot or deviation with respect to or from a pivot line P1 as best shown in FIGS. 2A-2B). In the engaged position, the swing arm 85 has pivoted about arrow A1 and is angled with respect to or from a pivot line P1 illustrated by $\theta_1$, as best shown in FIGS. 3A-3B. The angle may be an acute angle.

Figure 7:
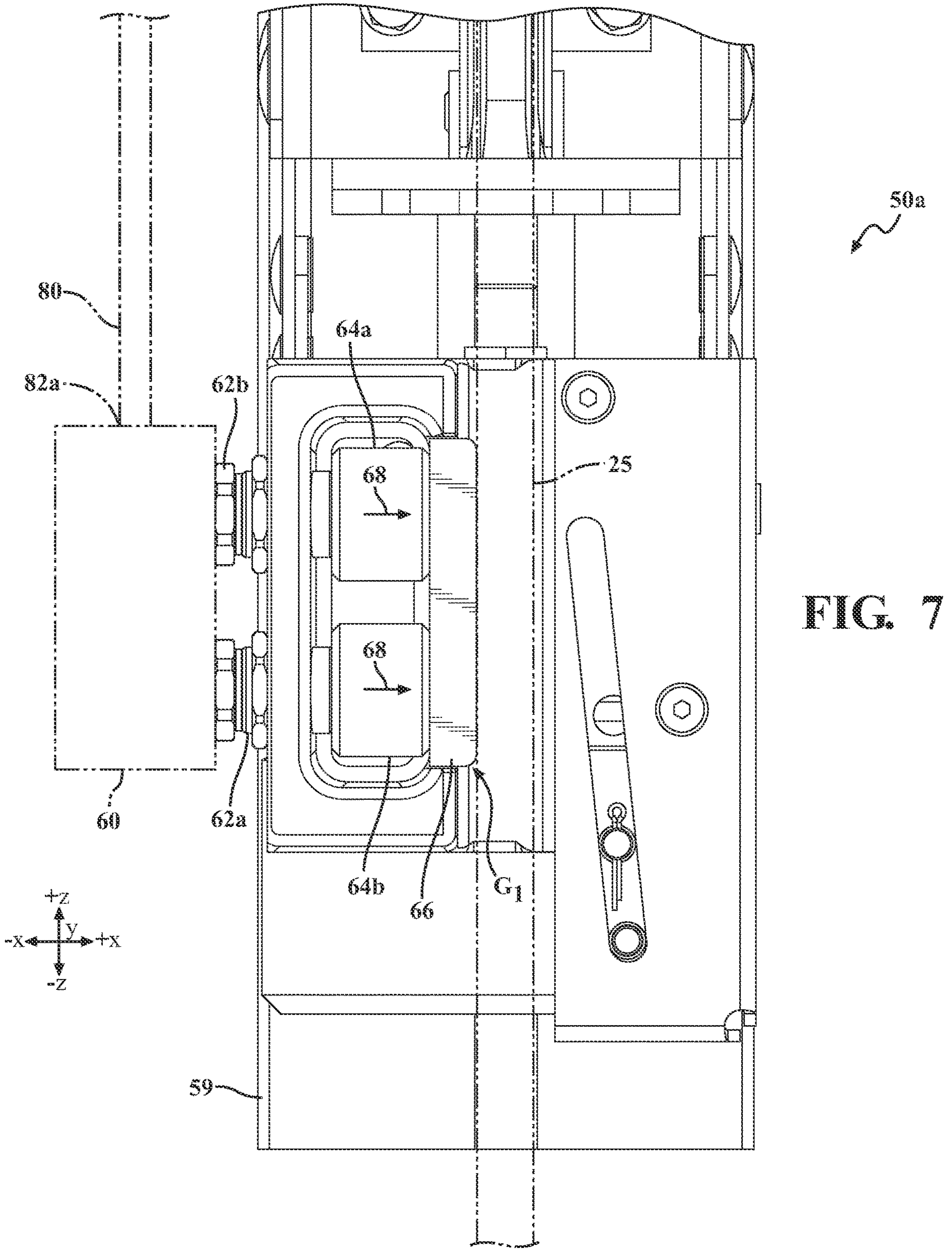
FIG. 7 schematically depicts a partial isolated side view of the brake shoe assembly of FIG. 6 with the brake shoe assembly in an activated state according to one or more embodiments shown and described herein.

In the engaged position, the swing arm 85 is angled with respect to the end beam 40*a* which moves the linkage 80 to activate the braking assembly 32, as illustrated in FIGS. 3A-3B and 7. When the swing arm 85 is in the disengaged position, the braking assembly is in the unactivated state, as illustrated in FIGS. 2A-2B and 6. Therefore, the movement of the linkage 80 based on the position of the swing arm 85 changes or initiates the braking assembly 32 to change states between the unactivated state, where the counterweight frame may freely move about the rails 25 and the activated state, where the braking assembly prevents or inhibits movement of the counterweight frame assembly 22 to move about the rails 25.

That is, the braking assembly 32 is configured to move between an unactivated state where the braking assembly is free from the rails 25 and an activated state where the braking assembly 32 engages with the rails 25 to inhibit movement of the counterweight frame assembly 22 dependent on the position of the swing arm 85. When the swing arm 85 is in the disengaged position, as best illustrated in FIGS. 2A-2B, the braking assembly 32 is in the unactivated state, as best illustrated in FIG. 6, and when the swing arm 85 is moved into the engaged position based on a tension on the flexible elongated member 34, as best illustrated in FIGS. 3A-3B, the braking assembly 32 is moved or triggered into the activated state, as best illustrated into FIG. 7.

It should now be understood that described above is an elevator assembly that includes a counterweight governor assembly mounted within a counterweight frame itself and uses a single cable to activate the governor. The counterweight governor assembly described includes a governor pulley rotatably coupled to a swing arm, which is pivotally coupled to the frame of the counterweight frame. When the governor pulley of the governor assembly locks, a swing arm moves or pivots that activates an actuation device to activate a braking assembly, thus inhibiting movement of the counterweight frame within the hoistway. Since the governor assembly is completely contained within the counterweight frame, the governor assembly does not require any additional space in the hoistway. The single cable is stationary, and therefore it does not require running clearance to the other stationary components in the hoistway. Each of the pulleys of the governor assembly are arranged in such a way as to minimize the vertical height of the total assembly and allow the assembly to fit inside the counterweight frame and to move with the counterweight frame.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An elevator counterweight governor assembly for an elevator assembly, the elevator assembly having a counterweight frame, a plurality of weights, at least one counterweight suspension member, and a fixed member of a hoistway, the counterweight frame defined by a pair of end beams, a header member, a base member, and at least one inner beam positioned between the pair of end beams, each of the pair of end beams and the at least one inner beam are spaced apart and extend in a direction that is parallel with one another extending between and from the header member to the base member in a direction perpendicular to the header member and the base member defining a cavity between the header member, the base member, one of the pair of end beams, and the at least one inner beam, the at least one counterweight suspension member moves the counterweight frame between a plurality of positions in the hoistway and the fixed member guides the counterweight frame within the hoistway between the plurality of positions, the elevator counterweight governor assembly comprising:

a swing arm mounted within the cavity of the counterweight frame and pivotally coupled to the at least one inner beam at one end, the swing arm configured to pivot between a disengaged position and an engaged position; and a braking assembly configured to move between an unactivated state where the braking assembly is free from the fixed member and an activated state where the braking assembly engages with the fixed member to inhibit movement of the counterweight frame, wherein, when the swing arm is in the disengaged position, the braking assembly is in the unactivated state and when the swing arm is in the engaged position, the braking assembly is in the activated state.

2. The elevator counterweight governor assembly of claim 1, wherein the swing arm is generally perpendicular between the at least one inner beam and one of the pair of end beams when in the disengaged position and is angled with respect to the one of the pair of end beams in the engaged position.

3. The elevator counterweight governor assembly of claim 2, further comprising:

a first pulley assembly rotatably coupled to the swing arm;

a second pulley assembly rotatably coupled to the swing arm; and a third pulley assembly rotatably coupled to the swing arm.

4. The elevator counterweight governor assembly of claim 3, further comprising:

a bracket assembly extending from the swing arm in a vertical direction, the bracket assembly having an end wall and a pair of sidewalls to define a channel, the first pulley assembly rotatably coupled to the pair of sidewalls within the channel.

5. The elevator counterweight governor assembly of claim 4, further comprising:

a tensioner assembly extending from the bracket assembly, the tensioner assembly having:

an arm having a first end coupled to one of the pair of sidewalls and an opposite second end, an engaging member coupled to the second end, and a biasing member extending between one of the pair of sidewalls and the arm.

6. The elevator counterweight governor assembly of claim 3, wherein the third pulley assembly further comprises:

a pair of pulleys, each of the pair of pulleys are concentric with one another and configured to independently rotate.

7. The elevator counterweight governor assembly of claim 3, further comprising:

a flexible elongated member having a proximate end and a distal end, the proximate end fixedly coupled to a mounting position within the hoistway at a position above the counterweight frame in a vertical direction, the distal end coupled to a mass or a spring to maintain a predetermined tension of the flexible elongated member.

8. The elevator counterweight governor assembly of claim 7, wherein the flexible elongated member is routed between the first pulley assembly, the second pulley assembly, and the third pulley assembly.

9. An elevator counterweight governor assembly for an elevator assembly, the elevator assembly having a counterweight frame and a fixed member of a hoistway, the counterweight frame defined by a pair of end beams, a header member, a base member, and at least one inner beam positioned between the pair of end beams, each of the pair of end beams and the at least one inner beam are spaced apart and extend in a direction that is parallel with one another extending between and from the header member to the base member in a direction perpendicular to the header member and the base member defining a cavity between the header member, the base member, one of the pair of end beams, and the at least one inner beam, the elevator counterweight governor assembly comprising:

a swing arm positioned within the cavity and pivotally coupled to the at least one inner beam at one end, the swing arm configured to pivot between a disengaged position and an engaged position;

a sheave assembly rotatably coupled to the swing arm;

a flexible elongated member routed through the sheave assembly;

a braking assembly configured to move between an unactivated state where the braking assembly is free from the fixed member and an activated state where the braking assembly engages with the fixed member to inhibit movement of the counterweight frame, wherein, when the swing arm is in the disengaged position, the braking assembly is in the unactivated state and when the swing arm is moved into the engaged position based on a tension on the flexible elongated member, the braking assembly is in the activated state.

10. The elevator counterweight governor assembly of claim 9, wherein the flexible elongated member has a proximate end and an opposite distal end, the proximate end fixedly coupled to a mounting position within the hoistway at a position above the counterweight frame in a vertical direction, the distal end coupled to a mass or a spring to maintain a predetermined tension of the flexible elongated member.

11. The elevator counterweight governor assembly of claim 9, wherein the swing arm is generally perpendicular between the at least one inner beam and one of the pair of end beams when in the disengaged position and is angled with respect to the one of the pair of end beams in the engaged position.

12. The elevator counterweight governor assembly of claim 9, further comprising:

a bracket assembly extending from the swing arm in a vertical direction, the bracket assembly having an end wall and a pair of sidewalls to define a channel.

13. The elevator counterweight governor assembly of claim 12, wherein the sheave assembly further comprises:

a first pulley assembly rotatably coupled to the pair of sidewalls within the channel;

a second pulley assembly rotatably coupled to the swing arm; and a third pulley assembly rotatably coupled to the swing arm.

14. The elevator counterweight governor assembly of claim 13, further comprising:

a tensioner assembly extending from the bracket assembly, the tensioner assembly having:

an arm having a first end coupled to one of the pair of sidewalls and an opposite second end, an engaging member coupled to the second end, and a biasing member extending between one of the pair of sidewalls and the arm.

15. The elevator counterweight governor assembly of claim 14, wherein the flexible elongated member is routed between the first pulley assembly, the second pulley assembly, and the third pulley assembly.

16. The elevator counterweight governor assembly of claim 13, wherein the third pulley assembly further comprises:

a pair of pulleys, each of the pair of pulleys are concentric with one another and configured to independently rotate.

17. An elevator assembly having a hoistway, the elevator assembly comprising:

a fixed member of the hoistway;

a counterweight frame having a pair of end beams, a header member, a base member, and at least one inner beam positioned between the pair of end beams, each of the pair of end beams and the at least one inner beam are spaced apart and extend in a direction that is parallel with one another extending between and from the header member to the base member in a direction perpendicular to the header member and the base member defining a cavity between the header member, the base member, one of the pair of end beams, and the at least one inner beam, one of the pair of end beams having a notch portion, the counterweight frame configured to slidably move along the fixed member; and a counterweight governor assembly comprising:

a swing arm positioned within the cavity and pivotally coupled to the at least one inner beam at one end and a linkage assembly at an opposite end, the swing arm configured to pivot between a disengaged position and an engaged position;

a sheave assembly rotatably coupled to the swing arm, the sheave assembly having at least one sheave positioned to extend at least partially into the notch portion of the one of the pair of end beams;

a flexible elongated member routed through the sheave assembly; and a braking assembly configured to move between an unactivated state where the braking assembly is free from the fixed member and an activated state where the braking assembly engages with the fixed member to inhibit movement of the counterweight frame, wherein, when the swing arm is in the disengaged position, the braking assembly is in the unactivated state and when the swing arm is moved into the engaged position based on a tension on the flexible elongated member, the braking assembly is in the activated state.

18. The elevator assembly of claim 17, wherein the flexible elongated member has a proximate end and an opposite distal end, the proximate end fixedly coupled to a mounting position within the hoistway at a position above the counterweight frame in a vertical direction, the distal end coupled to a mass or a spring to maintain a predetermined tension of the flexible elongated member.

19. The elevator assembly of claim 18, further comprising:

a bracket assembly extending from the swing arm in the vertical direction, the bracket assembly having an end wall and a pair of sidewalls to define a channel, a tensioner assembly extending from the bracket assembly, the tensioner assembly having:

an arm having a first end coupled to one of the pair of sidewalls and an opposite second end, an engaging member coupled to the second end, and a biasing member extending between one of the pair of sidewalls and the arm, wherein the tensioner assembly assist in provide the predetermined tension to the flexible elongated member.

20. The elevator assembly of claim 19, wherein the sheave assembly further comprises:

a second pulley assembly rotatably coupled to the pair of sidewalls within the channel; and a third pulley assembly rotatably coupled to the swing arm.

* * * * *